(12) United States Patent
Chavie et al.

(10) Patent No.: US 9,785,958 B2
(45) Date of Patent: Oct. 10, 2017

(54) TECHNIQUES FOR TRACKING AND LIMITING ELECTRONIC OFFERS

(75) Inventors: Richard Chavie, Gainesville, GA (US); Norman Perkins Blake, Zionsville, IN (US)

(73) Assignee: NCR Corporation, Duluth, GA (US)

( * ) Notice: Subject to any disclaimer, the term of this patent is extended or adjusted under 35 U.S.C. 154(b) by 535 days.

(21) Appl. No.: 13/460,834

(22) Filed: Apr. 30, 2012
(Under 37 CFR 1.47)

(65) Prior Publication Data
US 2013/0290082 A1    Oct. 31, 2013

(51) Int. Cl.
*G06Q 30/00* (2012.01)
*G06Q 30/02* (2012.01)

(52) U.S. Cl.
CPC ................. *G06Q 30/0207* (2013.01)

(58) Field of Classification Search
CPC .................. G06Q 30/0207–30/0277
See application file for complete search history.

(56) References Cited

U.S. PATENT DOCUMENTS

| | | | | |
|---|---|---|---|---|
| 3,573,747 A * | 4/1971 | Adams | ................ | H04L 12/1804 340/4.51 |
| 8,538,892 B2 * | 9/2013 | Humpleman | ........ | G06Q 20/382 705/14.38 |
| 8,682,748 B1 * | 3/2014 | Baciu | ..................... | G06Q 30/01 705/26.1 |
| 2002/0198777 A1 * | 12/2002 | Yuasa | .................. | G06Q 20/045 705/14.26 |
| 2009/0063248 A1 * | 3/2009 | Chong | ............... | G06Q 30/0201 705/7.29 |
| 2009/0265229 A1 * | 10/2009 | Sidhu | ..................... | G06Q 30/02 705/14.69 |
| 2010/0070364 A1 * | 3/2010 | Dugan | .................. | G06Q 30/02 705/14.43 |
| 2010/0318407 A1 * | 12/2010 | Leff | ..................... | G06Q 10/107 705/14.1 |
| 2011/0047023 A1 * | 2/2011 | Lieblang | ................ | G06Q 30/02 705/14.36 |
| 2011/0161142 A1 * | 6/2011 | Dunn | ..................... | G06Q 30/02 705/14.1 |
| 2011/0167456 A1 * | 7/2011 | Kokenos | ................ | G06Q 30/02 725/60 |
| 2011/0191152 A1 * | 8/2011 | Schwartz | ............. | G06Q 20/387 705/14.1 |
| 2011/0251880 A1 * | 10/2011 | Butler | .................... | G06Q 10/10 705/14.13 |
| 2012/0022930 A1 * | 1/2012 | Brouhard | ............... | G06Q 30/02 705/14.22 |
| 2012/0047003 A1 * | 2/2012 | Hammad | ........... | G06Q 30/0207 705/14.1 |
| 2012/0089617 A1 * | 4/2012 | Frey | .................. | G06F 17/30867 707/748 |

(Continued)

*Primary Examiner* — Matthew T Sittner
(74) *Attorney, Agent, or Firm* — Schwegman, Lundberg & Woessner

(57) ABSTRACT

Techniques for tracking and limiting electronic offers are provided. Identifiers are generated and linked to an electronic offer as the offer is propagated threw a network or propagated over disparate networks. Each identifier associated with a unique recipient receiving the offer. Metrics are gathered for the offer's propagation and a distribution policy is dynamically enforced as each new recipient attempts to access the offer.

12 Claims, 3 Drawing Sheets

(56) References Cited

U.S. PATENT DOCUMENTS

| | | | | |
|---|---|---|---|---|
| 2012/0095822 A1* | 4/2012 | Chiocchi | G06Q 30/0207 | |
| | | | 705/14.26 | |
| 2012/0330746 A1* | 12/2012 | Gasparine | G06Q 30/0207 | |
| | | | 705/14.44 | |
| 2013/0073371 A1* | 3/2013 | Bosworth | G06Q 30/02 | |
| | | | 705/14.35 | |
| 2013/0132220 A1* | 5/2013 | Baum | G06Q 30/02 | |
| | | | 705/26.1 | |
| 2013/0166361 A1* | 6/2013 | Gaur | G06Q 30/02 | |
| | | | 705/14.1 | |
| 2013/0290082 A1* | 10/2013 | Chavie | G06Q 30/0207 | |
| | | | 705/14.13 | |

* cited by examiner

TECHNIQUES FOR TRACKING AND LIMITING ELECTRONIC OFFERS

BACKGROUND

Consumers are increasingly using kiosks to conduct business with enterprises. The kiosks come in a variety of sizes and are used for a variety of purposes. Some kiosks are drive through, such as fast food establishments, pharmacies, banks, and the like. Other kiosks are stationary located in gas stations, airlines, grocery stores, department stores, and the like.

In addition, what is considered a kiosk is evolving with today's technology. For example, digital signs now provide advertisements and mechanisms for users to interact with the displays to perform transactions. Such mechanisms include blue tooth communication, Near Field Communication (NFC), Quick Response (QR) code scanning, Wi-Fi communication, and the like.

Consumers can even use their portable digital devices to perform transactions or interact with enterprise kiosks. One such popular approach is to distribute coupons to and redeem coupons from mobile phones. In fact, with public environmental concerns regarding the use of paper products and with the widespread adoption of smart phones and electronic transactions, the use of electronic coupons is becoming increasingly popular with both the consumers and the enterprises providing those electronic coupons.

Typically, these electronic coupons have serial numbers represented as bar codes that allow enterprises to automatically recognize and redeem the coupons and restrict conditions of the coupons. However, enterprises lack the ability to track or to monitor who handles a particular coupon or class of coupons once those coupons are injected into an electronic media and subsequently distributed to various networks available to the consumers.

Thus, a wealth of information regarding consumer networks and the influence of particular consumers and networks are being lost by enterprises; thereby, preventing enterprises from maximizing the electronic medium for the benefit of the enterprises.

Moreover, short of restricting an electronic coupon to a particular consumer and/or short of restricting an electronic coupon to a single redemption, enterprises lack the ability to monitor and to restrict a coupon's redemption based on how that coupon is distributed and/or how often the coupon is transferred before its redemption, which may be of import to the enterprises.

In short, although electronic coupons are widely used in the industry, the enterprises are presently unable to leverage, control, track, and optimize the process once coupons are initially generated in an electronic format and initially distributed to consumers.

SUMMARY

In various embodiments, techniques for tracking and limiting an electronic offer are presented. According to an embodiment, a method for tracking an electronic offer is provided.

Specifically, an electronic offer is linked to a recipient identifier and the electronic offer is distributed to a recipient associated with the recipient identifier. Subsequently, a request is received for a next recipient identifier, which indicates that a next recipient is now in possession of the electronic offer. In response thereto, the next recipient identifier is linked to the electronic offer.

DETAILED DESCRIPTION

Figure 1:
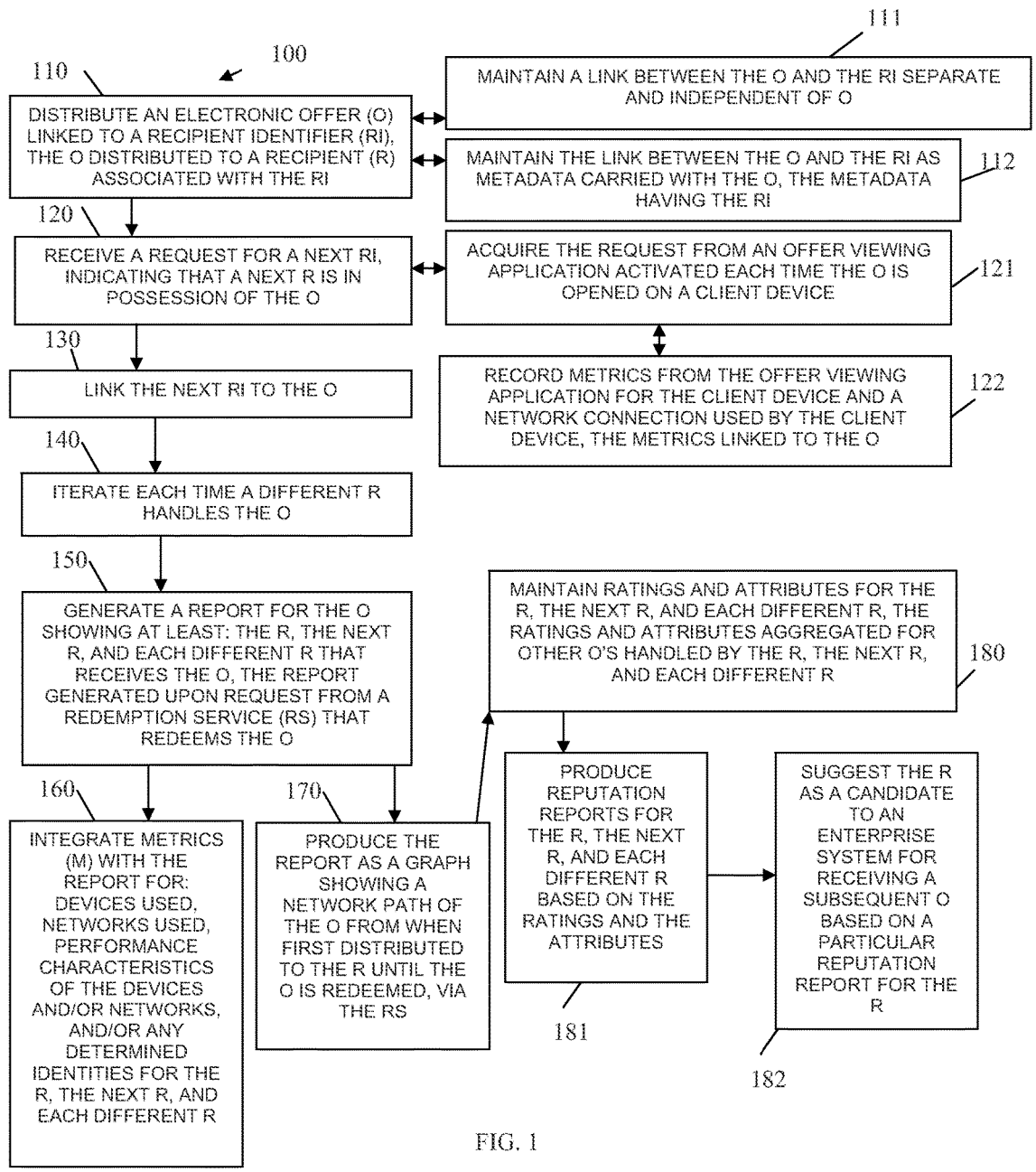
FIG. 1 is a diagram of a method for tracking an electronic offer, according to an example embodiment.

FIG. 1 is a diagram of a method 100 for tracking an electronic offer, according to an example embodiment. The method 100 (hereinafter "offer monitor manager") is implemented as instructions programmed and residing on a non-transitory computer-readable (processor-readable) storage medium and executed by one or more processors (e.g., server, cloud, virtual machine (VM), etc.) over a network connection. The processors are specifically configured and programmed to process the offer monitor manager. The offer monitor manager operates over a network. The network is wired, wireless, or a combination of wired and wireless.

Conventionally, coupon offers that are distributed from one consumer to another consumer lack a mechanism for unique identifiers of each subsequent round of coupons from the original source consumer. In addition, the linkage of any consumer-distributed coupons to identify subsequent rounds of receiving consumers is not tracked directly, making identification of the social network of individuals associated with the distribution of the original coupon impossible.

The various embodiments herein solve this problem. For example and in an embodiment, digital offers (electronic offers) are provided with unique identifiers that allow for registration of the offers as part of a redemption process. The registration process allows for a participant identifier (id) to be associated with the offers, although it does not require the participant to be personally identified nor is it necessary to have the consumer id in order to track the distribution pattern of the offers, since the offers themselves are "genetic", i.e., an algorithm generates a "child" identifier as each participant reissues an offer to subsequent participants. Accordingly, the techniques herein can trace each offer back to a parent id for each round of distribution that a particular participant initiates and the techniques know which round each offer is associated with, with or without an associated consumer id. Therefore the techniques can identify members of the network of either "named" or "anonymous" individuals, whom are associated with the coupon as well as which tier of distribution they belong to. When "named" with a participant id, the techniques herein can trace network participants and their performance in generating new rounds of coupons. When a named participant is associated with multiple offers, network relationships can be observed and the productivity of participants in influencing network behavior of offer adoption or response can be measured. Moreover, when participants are not named, the influence of the unnamed participant can still be observed albeit limited to a particular wave (distribution pattern).

In another embodiment presented below with respect to the discussion of the FIG. 2, a self-limiting feature of a viral electronic offer is such that an algorithm, which creates the offer, only allows for a predetermined propagation of subsequent offers for any participant in any wave. Furthermore, by using existing web infrastructure and social networking technologies this approach can be propagated across communication channels, such that an initial coupon can be launched, for example from a personal computer (PC) and propagated thru mobile, kiosk and event Automated Teller Machine (ATM) systems, or vice versa.

With this initial context and the discussion that follows, the techniques enable the initiator of offers to create and observable a network of participants, where previously there was not an ability to track relationships or the influence of particular members of the network.

Moreover, it is noted that the processing is discussed from the perspective of a network server for the offer monitor manager. The manner in which the offer monitor manager is contacted can occur in a variety of fashions. For example, the electronic offers can include specific access applications (viewers), which are configured to contact the offer monitor manager each time the electronic offers are opened for access, such as viewing or printing. These viewers can be existing viewers, such as PDF, word processing applications, or image viewers, all of which have Application Programming Interface (API) calls that can be embedded within the electronic offers forcing such viewers to contact the offer monitor manager (remote network service). In other cases, the viewers are proprietary to the electronic offers, such that these particular viewers are designed to contact the offer monitor manager each time any electronic offer is opened. So, existing viewers can be used by embedding API calls within the offers to force such viewers to contact the offer monitor manager; alternatively a specific viewer for electronic offers can be provided that is preconfigured to contact the offer monitor manager when an offer is accessed.

At 100, the offer monitor manager distributes an electronic offer that is linked to a recipient identifier. The electronic offer distributed to a recipient associated with the recipient identifier. The distribution from the offer monitor manager can also occur via a third-party, such as a loyalty system of an enterprise. So, a loyalty system is interfaced to the offer monitor manager and request that an offer be generated based on some predefined conditions, in response, the offer monitor manager generates an electronic formatted offer and associates the recipient identifier for the recipient. The recipient can be anonymous or known and linked to a particular customer. It may also be that the offer monitor manager provides a linkage to an existing enterprise offer for the recipient, via the recipient identifier. In still other situations, the offer monitor manager can directly distribute the electronic offer with the linkage to the recipient, via the recipient identifier.

Distribution can occur via a variety of physical network channels, such as via Bluetooth, Wi-Fi, Satellite, Cellular, Near Field Communication (NFC), Short Message Service (SMS (text message)), instant message, etc. Moreover, distribution can occur via a variety of logical networks, including social networks, such as Linkedin®, Facebook®, Twitter®, email, and others.

According to an embodiment, at 111, the offer monitor manager maintains a link between the electronic offer and the recipient identifier separately and independently of the content file that comprises the electronic offer. This can be achieved via a unique identifier (such as, but not limited to, a bar code or Quick Response (QR) code) for the electronic offer, such that the offer identifier is used to obtain the recipient identifier (which is also linked to the recipient (anonymously or non anonymously)).

In an alternative scenario, at 112, the offer monitor manager maintains the link between the electronic offer and the recipient identifier as metadata that is physically carried with the content file that comprises the electronic offer. The metadata of the electronic offer includes the recipient identifier. One benefit of the approach in 112 is that any specific copy of an electronic offer can be evaluated based on the metadata to determine who has accessed such copy.

At 120, the offer monitor manager receives a request for a next recipient identifier, which indicates that a next recipient is in possession of the electronic offer and attempting to open or print the electronic offer.

In an embodiment, at 121, the offer monitor manager acquires the request from an offer viewing application, which is activated each time the electronic offer is opened or attempted to be printed on a client device (phone, tablet, computer, etc.). Some examples of how this can be achieved were presented above.

Continuing with the embodiment of 121 and at 122, the offer monitor manager records metrics from the offer viewing application for the client device and a network connection used by the client device. The metrics are linked to the electronic offer and/or the recipient associated with the client device. This can be a variety of information, such as device type, physical network used, logical network used, date, time of day, offer viewing application type/identifier, and the like.

At 130, the offer monitor manager links the next recipient identifier to the electronic offer. Again, this can be achieved outside the content of the electronic offer or carried and embedded within the electronic offer via metadata for the electronic offer.

According to an embodiment at 140, the offer monitor manager iterates the processing of 120-130 each time a different and unique recipient handles (opens or tries to print) the electronic offer. So, the entire history of recipients and the order of recipients can be tracked and maintained with the electronic offer.

Continuing with the embodiment of 140 and at 150, the offer monitor manager generates a report for the electronic offer, which at least shows: the recipient (initial user or automated service that was distributed the offer), the next recipient, and each different recipient that handled the electronic offer. Moreover, the order of handling and date and time of handling is provided. The report generated upon request from a redemption service that redeems the electronic offer. So, an enterprise redeeming the offer can request from the offer monitor manager the report.

Continuing again with the embodiment of 150 and at 160, the offer monitor manager integrates metrics with the report. The metrics include by way of example only: devices used with the offer, networks used (physical and/or logical), performance characteristics of the networks and/or the devices, and/or any determined identities for the recipient, the next recipient, and each different recipient handling the electronic offer.

Still continuing with the embodiment of 150 and at 170, the offer monitor manager produces the report as a graph showing a network path of the offer from when it was first distributed to the recipient until the offer is redeemed via the redemption service. This can be an interactive graph, showing copies of the offer, where each copy is at (redeemed or unredeemed), etc. Different effects can be used and colors within the graph and different overlays showing attributes of the electronic offer within the networks.

Again continuing with the embodiment of 150 and at 180, the offer monitor manager maintains ratings and attributes for the recipient, the next recipient, and each different recipient. The ratings and attributes aggregated for other offers handled by the recipients. So, performance in redeeming or redistributing the offer and other offers for each recipient can be maintained and used for analysis to determine which recipients are the best performers for enterprise offers or offers of particular types. Such ratings and attributes can also be separately and independently aggregated and maintained for physical and logical networks (discussed above).

Continuing with the embodiment of 180 and at 181, the offer monitor manager produces a reputation report for the recipient, the next recipient, and each different recipient. This is based on the ratings and the attributes. So, predefined criteria can be used to score and rate a recipient for specific offer types and/or for all offer types combined.

Still continuing with the embodiment of 181 and at 182, the offer monitor manager suggests the recipient as a candidate to an enterprise system for receiving a subsequent electronic offer based on a particular reputation report for that recipient. So, the offer monitor manager can provide an enterprise marketing campaign with a most lucrative recipient to send a proposed electronic offer to when an enterprise wants to maximize offer acceptance and distribution.

Figure 2:
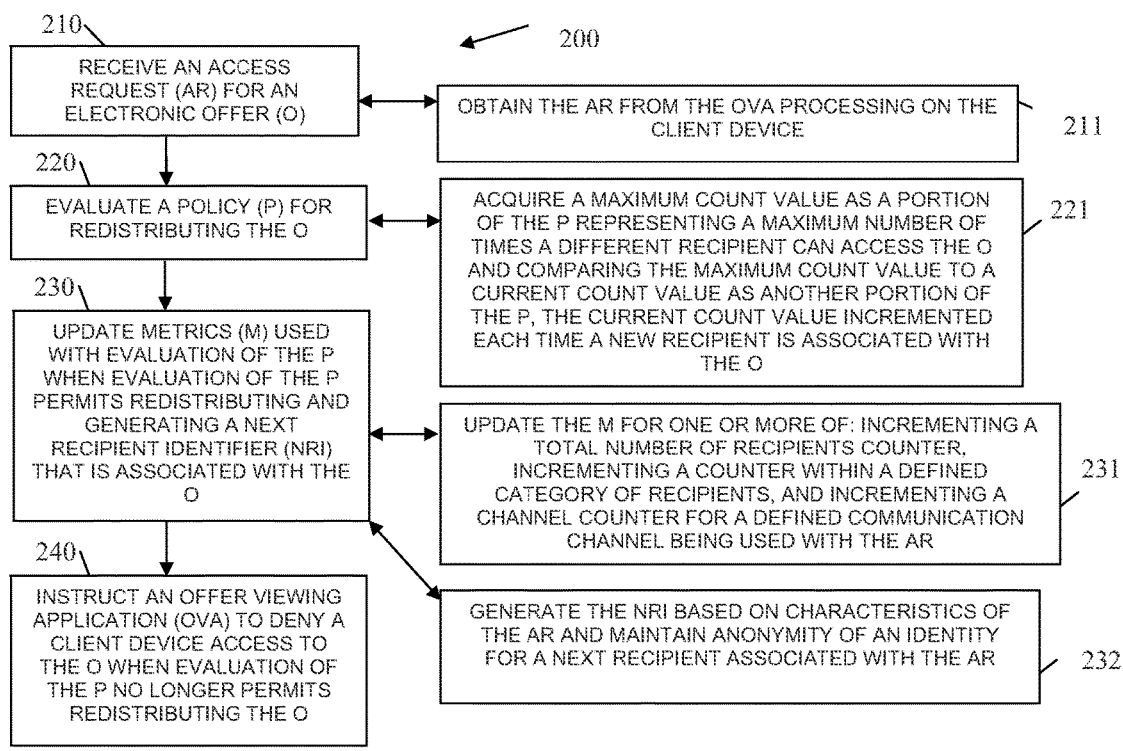
FIG. 2 is a diagram of a method for limiting redemption of an electronic offer, according to an example embodiment.

FIG. 2 is a diagram of a method 200 for limiting redemption of an electronic offer, according to an example embodiment. The method 200 (hereinafter "offer control manager") is implemented as instruction and programmed within a non-transitory computer-readable (processor-readable) storage medium that executes on one or more processors of a network-based machine; the processors of the machine are specifically configured to execute the offer control manager. The offer control manager is also operational over a network: the network is wired, wireless, or a combination of wired and wireless.

The processing of the offer control manager reflects enhanced and different aspects of the offer monitor manager represented by the method 100 of the FIG. 1. That is, the offer monitor manager demonstrates how electronic offers can be tracked and monitored. The offer control manager can use the analysis (ratings and reputations) and information (metrics) from the offer monitor manager to control redemption of and/or limit usage of an electronic offer.

At 210, the offer control manager receives an access request for an electronic offer. In other words, an electronic offer is being opened for printing, viewing, or even redemption on a client device of a consumer.

In an embodiment, at 211, the offer control manager obtains the access request from an offer viewing application that is processing on a client device of a consumer. This was discussed above with reference to the FIG. 1.

At 220, the offer control manager evaluates a policy for redistributing the electronic offer. This policy can be configured by an enterprise issuing the offer and it is dynamically evaluated as the offer is distributed and attempted to be accessed by consumers over electronic networks (physical and logical).

According to an embodiment, at 221, the offer control manager acquires a maximum count value as a portion of the policy. This represents a maximum number of times a different recipient can access the offer or that the offer can be redistributed to other consumers. This maximum count value is dynamically compared to a current count value, which is another portion (condition) of the policy. The current count value is incremented each time a new recipient is associated or attempted to be associated with the electronic offer over the networks.

At 230, the offer control manager updates metrics used with evaluation of the policy when evaluation of the policy permits redistributing and generating a next recipient identifier that is associated with the electronic offer. (Association of the identifiers with the offer was discussed above with respect to the FIG. 1; so in this sense the offer control manager performs some aspects of the offer monitor manager.)

In an embodiment, at 231, the offer control manager updates the metrics for one or more of: incrementing a total number of recipients counter, incrementing a counter within a category or class of recipients (i.e., Twitter® users), and/or incrementing a channel counter for a defined communication channel being used with the access request (i.e., SMS, Cellular, etc.).

In another scenario, at 232, the offer control manager generates a next recipient identifier based on characteristics of the access request and maintains anonymity of an identity for a next recipient associated with the access request. So, privacy can be maintained when needed or desired.

At 240, the offer control manager instructs an offer viewing application to deny a client device access to the electronic offer when evaluation of the policy no longer permits redistributing the offer.

One now appreciates that an electronic offer can be self-limiting meaning that as it is distributed and accessed, dynamic policy is enforced to determine whether restrictions are to be enforced or not.

Figure 3:
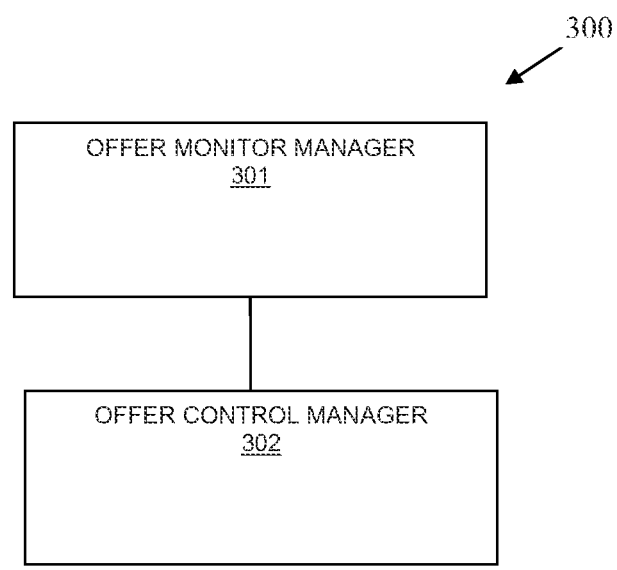
FIG. 3 is a diagram of an electronic offer tracking and limiting system, according to an example embodiment.

FIG. 3 is a diagram of an electronic offer tracking and limiting system 300, according to an example embodiment. The components of the electronic offer tracking and limiting system 300 are implemented as executable instructions and programmed within a non-transitory computer-readable (processor-readable) storage medium that execute on one or more processors of a network-based server (cloud, proxy, Virtual Machine (VM), etc.; the processors are specifically configured to execute the components of the electronic offer tracking and limiting system 300. The electronic offer tracking and limiting system 300 is also operational over a network; the network is wired, wireless, or a combination of wired and wireless.

The electronic offer tracking and limiting system 300 includes an offer monitor manager 301 and an offer control manager 302. Each of these components and the interactions of each component are now discussed in turn.

The electronic offer tracking and limiting system 300 includes a one or more network-based processors accessible over a network connection. The one or more processors executing instructions for the offer monitor manager 301, which resides and is programmed within a non-transitory computer-readable storage medium and processed on the one or more network-based processors. Example processing associated with the offer monitor 301 was presented in detail above with reference to the FIG. 1.

The offer monitor manager 301 is configured to link recipient identifiers for recipients of an electronic offer with that electronic offer and to further record metrics for the recipients and the electronic offer as the electronic offer is distributed and redeemed over one or more networks (physical and/or logical). It is noted that the recipient need not always be a consumer; that is the recipient can be an automated service as well.

According to an embodiment, the identifiers are anonymously maintained for privacy.

In another case, the identifiers are tied specifically to identities for consumers.

The electronic offer tracking and limiting system 300 also includes a one or more network-based processors accessible over a network connection. The one or more processors executing instructions for the offer control manager 302, which resides and is programmed within a non-transitory computer-readable storage medium and processed on the one or more network-based processors. Example processing associated with the offer control manager 302 was presented in detail above with reference to the FIG. 2.

The offer control manager 302 is configured to enforce a distribution policy assigned to the electronic offer using the metrics. The offer itself is self-limiting via the offer control manager 302, since when the offer is accessed the offer control manager 302 is contacted over the network and the distribution policy is then dynamically enforced.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A processor-implemented method for tracking and limiting an electronic offer, the method programmed in a non-transitory processor-readable medium and to execute on one or more processors of a hardware server configured to execute the method, comprising:
   distributing, by the hardware server over a first communication channel of a first network, the electronic offer linked to a recipient identifier, the electronic offer distributed to a recipient associated with the recipient identifier;
   receiving, at the hardware server, a request for a next recipient identifier, indicating that a next recipient is in possession of the electronic offer using a second communication channel of a second network;
   linking, by the hardware server, the next recipient identifier to the electronic offer;
   enforcing, by the hardware server, restrictions on redemption of the electronic offer by the next recipient, the enforcing performed on the hardware server by an offer control manager that enforces the restrictions based on a maximum number of times different recipients can redistribute the electronic offer and on the second communication channel being used by the next recipient for limiting usage of the electronic offer; and
   tracking, by the hardware server, usage of the electronic offer over the first and second communication channels for maintaining a distribution pattern for the electronic offer over at least the first and second networks by a plurality of recipients each associated with a recipient identifier.

2. The method of claim 1 further comprising, iterating, at the hardware server, the processing for the receiving and the linking each time a different recipient handles the electronic offer.

3. The method of claim 2 further comprising, generating, at the hardware server, a report for the electronic offer showing at least: the recipient, the next recipient, and each different recipient that receives the electronic offer, the report generated upon request from a redemption service that redeems the electronic offer.

4. The method of claim 3 further comprising, integrating, at the hardware server, metrics with the report for: devices used, networks used, performance characteristics of the devices and/or networks, and/or any determined identities for the recipient, the next recipient, and each different recipient.

5. The method of claim 3 further comprising, producing, at the hardware server, the report as a graph showing a network path of the electronic offer from when first distributed to the recipient until the electronic offer is redeemed, via the redemption service.

6. The method of claim 3 further comprising, maintaining, at the hardware server, ratings and attributes for the recipient, the next recipient, and each different recipient, the ratings and attributes aggregated for other electronic offers handled by the recipient, the next recipient, and each different recipient.

7. The method of claim 6 further comprising, producing, at the hardware server, reputation reports for the recipient, the next recipient, and each different recipient based on the ratings and the attributes.

8. The method of claim 7 further comprising, suggesting, by the hardware server, the recipient as a candidate to an enterprise system for receiving a subsequent electronic offer based on a particular reputation report for the recipient.

9. The method of claim 1, wherein distributing further includes maintaining a link between the electronic offer and the recipient identifier at the hardware server separate and independent of the electronic offer.

10. The method of claim 1, wherein distributing further includes maintaining the link between the electronic offer and the recipient identifier as metadata carried with the electronic offer, the metadata having the recipient identifier.

11. The method of claim 1, wherein receiving further includes acquiring the request from an offer viewing application activated each time the electronic offer is opened on a client device.

12. The method of claim 11, wherein receiving further includes recording metrics from the offer viewing application for the client device and a network connection used by the client device, the metrics linked to the electronic offer.

* * * * *